Patented Oct. 21, 1941

2,259,524

UNITED STATES PATENT OFFICE 2,259,524

METHOD FOR POLYMERIZING AND MOLDING UNSATURATED METHYLENE COMPOUNDS

Samuel S. Kistler, West Boylston, Mass., assignor, by mesne assignments, to E. I. du Pont de Nemours & Company, Wilmington, Del., a corporation of Delaware No Drawing. Application February 23, 1940,
Serial No. 320,414

4 Claims. (Cl. 18—58)

This invention relates to a method for polymerizing and molding the polymerizable unsaturated methylene compounds.

Various types of these polymerizable unsaturated methylene compounds, such as methyl methacrylate and copolymers thereof with methacrylic acid and methacrylic anhydride, are particularly adapted for use as optical bodies and other articles, such as airplane windows, which require properly shaped surfaces. These monomeric substances have been polymerized in glass molds shaped to provide sheets or blanks of the transparent resin. It has, however, been found that there is a comparatively high adhesion between the polymerized substance and the glass of the mold, and this adhesion is not uniform. Consequently, as the monomeric substance polymerizes and shrinks in volume, it tends to cling to the glass surface in places and to pull away from it in other places, thus leaving markings on the outer surface of the polymerized resin which are in the form of irregular figures or very fine wave marks. Such a molded surface, therefore, is not adaptable for optical purposes where clear vision or the formation of a perfect image is required. Many other substances have been tried for use as a mold and they have been found to have these or various other disadvantages. For example, if used for molding a copolymer of methyl methacrylate and methacrylic acid, iron and stainless steel are found to discolor the resin. Also, they are attacked by the resin and tend to inhibit the polymerization. Copper likewise is attacked, and it is a very strong inhibitor against polymerization. Nickel adheres to the resin and is also attacked. Aluminum also adheres, and it is difficult to produce and hold a polished surface in such a metal, owing to its being readily oxidized as well as such a soft material that it does not hold its shape well. The lead and tin alloys are also attacked and tend to produce a cloudy resin.

The primary object of this invention is to overcome these particular disadvantages and to provide a mold which will serve satisfactorily for the polymerization of unsaturated methylene compounds and which will give a long life of useful service without detrimentally affecting the polymerized product.

Another object is to provide a method of polymerizing and molding the unsaturated methylene compounds and producing shaped articles of required surface configuration. Further objects will be apparent in the following disclosure.

In accordance with my invention, I have found that silver will not inhibit polymerization. It is chemically inert and is not attacked by these resin substances. It does not discolor or otherwise detrimentally affect the product. It may be used with the acids as well as other polymerizable compounds. It may be polished to an accurately shaped surface. Because of these and other properties, silver is found to work satisfactorily as a mold surface for the polymerization of these unsaturated methylene compounds.

The walls of the mold may be made entirely of silver, but for the sake of economy and in order to attain proper strength of mold and permit greater facility in the handling of the mold and the treatment of the materials, it is preferable to employ iron, steel, brass, copper, glass or other base material and to coat the effective inner mold surfaces with silver. This is easily accomplished by electro-deposition of a layer of silver on the base metal, such as steel or brass, which is shaped to form the mold body. The silver coats all of the surfaces where the monomeric substance will contact with the mold body during the polymerization stage.

Various types of mold construction may be employed. For example, I may use two sheets of steel or brass which have been electroplated with silver on one side; and these two sheets are placed together with a flexible gasket of suitable material, such as any suitable elastic synthetic resin, interposed between the adjacent silver coated faces forming the interior of the mold. The gasket is of such dimensions, taking into account its compressibility, as to form the desired thickness of the molded resin body. These plates and gasket may be held together by suitable clamps. The mold may be readily filled through an opening in the gasket and the opening may then be closed to prevent access of air or heating bath material to the interior of the mold. The action of the clamps and the adhesive pull of the substance during polymerization tend to hold the plates firmly in contact with the shrinking product and thus maintain full contact of the silver surfaces with the resin. It is found that the silver has a mild adhesion for the resin during the early stages of polymerization but that at the end of this stage the plates may be very easily removed from the polymerized resin without detrimentally affecting the smooth surfaces of the resin and the plates. There are no shrinkage marks on the surface of the polymerized substance and the resin is found to be molded perfectly in accordance with the shape of the silver surface. The steel or brass plate may be highly polished to provide a very smooth plane surface prior to the electrodeposition of the silver thereon, and the silver may in turn be polished by any suitable standard method to insure that the mold has a very smooth and highly polished surface of required shape and dimensions. Silver is particularly useful where acrylic acid and the alpha substituted acrylic acids and their anhydrides are employed, since the silver is not attacked by these chemicals and the surface of the finished article will be the complement of the smooth polished silver surface of the mold.

This type of mold may be immersed in a constant temperature oil or water bath or placed in an oven having an atmosphere of uniform temperature and proper heat conditions for effecting the polymerizing stage. In either case, the outer mold body will be made of material that is not affected by the bath or atmospheric gases. An ordinary iron or brass body is well adapted for either purpose. It will be appreciated that the mold may be made otherwise to include suitable constructional features adapted to carry out any desired type of polymerizing and molding operations; hence the shape and arrangement of the mold may be widely varied, provided its effective inner surface which contacts with the monomeric substance to be polymerized is made of silver.

A multi-part mold or any other type of mold which may be suitably fashioned or assembled after it has been silver coated may be made by rolling a sheet of silver onto a properly shaped steel backing member, and this may be carried on in accordance with well known standard procedure. The sheet silver or the entire mold body may be made of standard materials and for the purpose of giving it strength or any other required purpose, it may contain a small amount of a suitable alloying constituent, such as copper, cadmium, zinc and tin; but these alloying metals are to be used only in a small amount so that the silver will be the preponderant ingredient and the properties of the mold will be dominated by the silver. Hence, the claims which specify silver are to be interpreted as covering those alloys which are composed chiefly of silver and wherein the other alloying ingredients will not impart sufficient detrimental properties to render the use of the alloy prohibitive.

The silver mold may be used for casting all of the polymerizable unsaturated methylene compounds. Examples of such compounds are the monohydric and the polyhydric alcohol esters of acrylic and methacrylic esters and the copolymers thereof with the various acids, anhydrides, and esters of such acids, as well as other substances. Other unsaturated methylene compounds are the ketones, ethers, aldehydes, the substituted ethylenes and the dienes, and their copolymers, such as methyl vinyl ketone, methyl vinyl ether, acrolein, styrene, vinyl chloride, vinyl acetate, chloroprene, divinyl acetylene and other unsaturated compounds capable of polymerizing to form a resin. Compatible substances of these different classes may be copolymerized in miscible proportions and under suitable polymerization conditions which are well known by those skilled in the art. This invention is, therefore, to be understood as applying to all of these various types of polymerizable unsaturated methylene compounds.

As an example of the method of procedure, I may make a lens blank or a sheet of window material of a mixture of methyl methacrylate and methacrylic acid in proportions of 80 parts of the former to 20 of the latter. The mixture of monomers may be placed within the mold formed of silver lined brass plates and entirely sealed therein by means of a flexible Thiokol (ethylene dichloride sodium polysulphide) or polyvinyl alcohol gasket held in place by clamps. This mold may then be immersed in a constant temperature water or oil bath held at a temperature below the boiling point of the monomeric substance, such as 50° C. which is effective for the polymerizing step. The mold is held at this temperature for four or five hours until polymerization has been substantially completed. The mold is then removed from the bath and the clamps taken off the mold plates. It will be found that the silver surface plates strip easily from the polymerized resin without affecting its surface. The sheet of resin may be thereafter subjected to any further treatment that may be desire, such as heating the same at a temperature between 100° and 150° C., or below its softening point, to complete the polymerization and harden the mass still further. Numerous modifications may be made in this polymerization step. The monomeric substance may be subjected to pressure, if desired, during the polymerization, and this may be produced by directly applying pressure to the mold plates or to the substance within the mold. This may be accomplished by polymerizing the substance in an autoclave carrying a suitable gas pressure, which is transmitted through the movable mold walls to the resin as it is formed. The monomeric substance shrinks as it polymerizes, and the pressure serves to hold the resin in full contact with the silver surface so that the resin shape is the complement of that mold surface. Various other expedients may be adopted for forcing the resin into full contact with the mold surface.

I claim:

1. The method of polymerizing a substance containing an unsaturated methylene compound comprising the steps of placing the monomeric substance in a mold, the effective interior surface of which is composed of silver, then subjecting the material while in said mold to heat and causing polymerization thereof and thereafter removing the polymerized resin from the mold.

2. The method of polymerizing a polymerizable substance containing an acidic monomeric unsaturated methylene compound comprising the steps of mixing a substance selected from the group of acrylic acid and the alpha substituted acrylic acids and their anhydrides with a compatible amount of a different polymerizable unsaturated methylene compound and copolymerizing the substances in a mold having its effective inner surface composed of silver and thereby forming a resin body having its surface the complement of the silver mold surface.

3. The method of making a shaped polymerized resin comprising the steps of providing a substance containing a monomeric polymerizable unsaturated methylene compound, placing that substance within a mold whose inner surface is accurately shaped and composed of polished silver, heating the mold and its contents to a temperature below the boiling point of the monomeric substance to effect polymerization thereof, while subjecting the mass to pressure and maintaining contact of the material with the silver face of the mold and thereby forming a surface on the polymerized article which is the complement of the silver mold surface, and thereafter removing the polymerized resin from the mold without detrimentally affecting the surface of either.

4. The method of making a shaped polymerized resin from a substance containing a monomeric unsaturated methylene compound comprising the steps of placing said monomeric compound in a mold, the effective surface of which is composed of silver, then polymerizing the compound while confined in contact with said silver surface and forming a readily removable shaped mass having a surface which is the complement of the silver surface.

SAMUEL S. KISTLER.